United States Patent
Aquino et al.

[11] Patent Number: 5,503,038
[45] Date of Patent: Apr. 2, 1996

[54] FREE FLOATING MULTIPLE ECCENTRIC DEVICE

[76] Inventors: Giovanni Aquino, 29 Byron Ave., Kenmore, N.Y. 14223; Ewan Choroszylow, 125 Church St., East Aurora, N.Y. 14052

[21] Appl. No.: 222,698

[22] Filed: Apr. 1, 1994

[51] Int. Cl.⁶ ............................ F02B 75/22; F16H 21/18
[52] U.S. Cl. ................. 74/49; 74/570; 123/55.5; 123/55.7; 123/197.1
[58] Field of Search .................. 74/49, 116, 570; 123/54.1, 55.5, 55.7, 197.1, 197.3, 197.4

[56] References Cited

U.S. PATENT DOCUMENTS

| | | | |
|---|---|---|---|
| 1,867,981 | 7/1932 | Mudd | 74/570 |
| 3,195,420 | 7/1965 | Johannsen | 123/55.5 |
| 3,946,706 | 3/1976 | Pailler | 123/55.7 |
| 4,013,048 | 3/1977 | Reitz | 123/55.7 |
| 4,078,439 | 3/1978 | Iturriaga-Notaric | 74/53 X |
| 4,485,768 | 12/1984 | Heniges | 123/55.5 |
| 4,512,291 | 4/1985 | Kirk | 123/55.7 |

FOREIGN PATENT DOCUMENTS

| | | | |
|---|---|---|---|
| 2720284 | 12/1978 | Germany | 74/570 |
| 996734A | 2/1983 | U.S.S.R. | 123/197.3 |

Primary Examiner—Rodney H. Bonck
Assistant Examiner—Troy Grabow
Attorney, Agent, or Firm—Howard J. Greenwald

[57] ABSTRACT

An apparatus for directly converting rotary motion to alternating linear motion comprising a cylindrical shaft and a first eccentric mounted on said shaft, a multiple eccentric comprised of a second eccentric, a third eccentric, and a first cylindrical bore extending through said second eccentric and said third eccentric, a first slide, and a second slide. Each of the eccentrics has the same eccentricity. The rotation of the shaft causes the first slide and the second slide to engage in reciprocting linear movement in different directions from each other.

9 Claims, 13 Drawing Sheets

FREE FLOATING MULTIPLE ECCENTRIC DEVICE

FIELD OF THE INVENTION

An apparatus for converting rotary motion to alternating linear motion in at least two directions.

BACKGROUND OF THE INVENTION

The "scotch yoke" apparatus is well known to those skilled in the art. See, e.g., U.S. Pat. Nos. 5,092,185, 5,085,401, 5,080,565, 5,078,017, 4,977,864, 4,967,558, 4,889,039, and 4,842,492. The disclosure of each of these patents is hereby incorporated by reference into this specification.

The prior art "scotch yoke" apparatus converts rotary motion into one form of linear motion which, in turn, is converted into an orthogonal linear motion. Because energy is wasted in each conversion step, this apparatus is not very efficient.

It would be desirable to be able to directly convert rotary motion into alternating linear motion in at least two different directions. To the best of applicants' knowledge, there is no device disclosed or available which can achieve this goal.

It is an object of this invention to provide a device for directly converting rotary motion to alternating linear motion in at least two different directions.

It is another object of this invention to provide a compressor or pump comprising the device of this invention.

It is yet another object of this invention to provide an engine comprising the device of this invention.

SUMMARY OF THE INVENTION

In accordance with this invention, there is provided an apparatus for directly converting rotary motion to alternating linear motion. This apparatus is comprised of a shaft, an eccentric integrally connected to such shaft, a bearing mounted on the eccentric of said shaft, an integral multiple eccentric contiguous with the eccentric on said shaft, and a slide on each of the eccentrics.

BRIEF DESCRIPTION OF THE DRAWINGS

The present invention will be more fully understood by reference to the following detailed description thereof, when read in conjunction with the attached drawings, wherein like reference numerals refer to like elements, and wherein.

DESCRIPTION OF THE PREFERRED EMBODIMENTS

Figure 1:
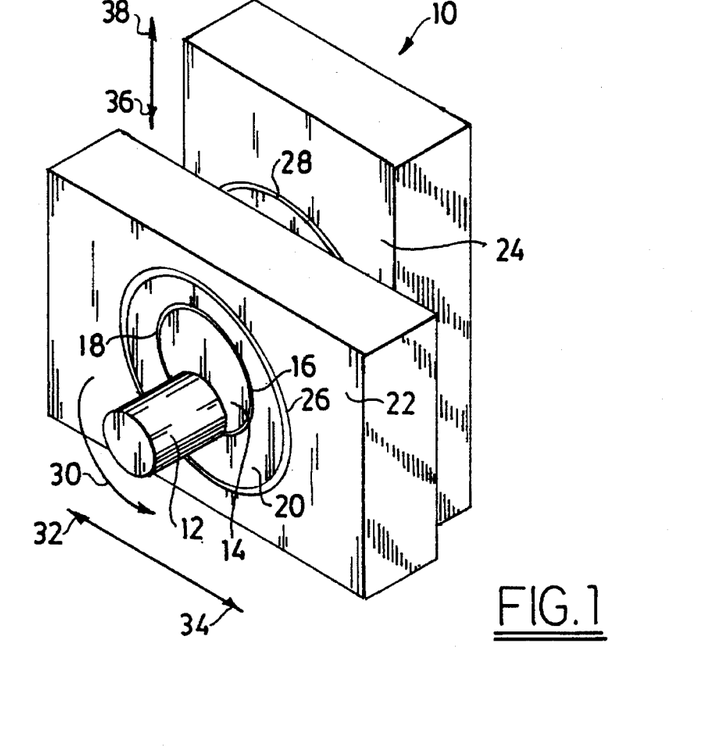
FIG. 1 is a front perspective view of one preferred translator of the invention.

FIG. 1 is a perspective view of a translator 10 which is capable of simultaneously and directly converting rotary motion into linear motion in at least two different directions. Referring to FIG. 1, it will be seen that translator 10 is comprised of shaft 12 and eccentric 14 integrally connected to shaft 12. The shaft 12/eccentric 14 assembly is contiguous with bearing sleeve 16 which is disposed within bore 18 of multiple eccentric 20.

Multiple eccentric 20 is comprised of at least two eccentric portions (not shown in Figure), each of which is disposed within a slide, such as slides 22 and 24. Each of said slides has a bearing sleeve (such as bearing sleeves 26 and 28) which is preferably fixed to its respective slide. Thus, referring to FIG. 1, bearing sleeve 26 is fixed to slide 22, and bearing sleeve 28 is fixed to slide 24.

Referring again to FIG. 1, as shaft 12 rotates counterclockwise in the direction of arrow 30, slide 22 will move linearly in the directions of arrows 32 and 34, and slide 24 will move in the direction of arrows 36 and 38.

Figure 2:
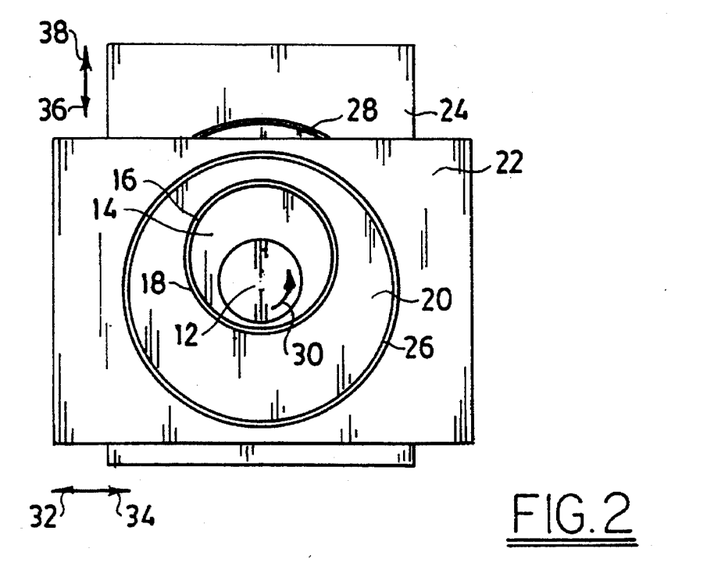
FIG. 2 is a full frontal view of the translator of FIG. 1.
Figure 3:
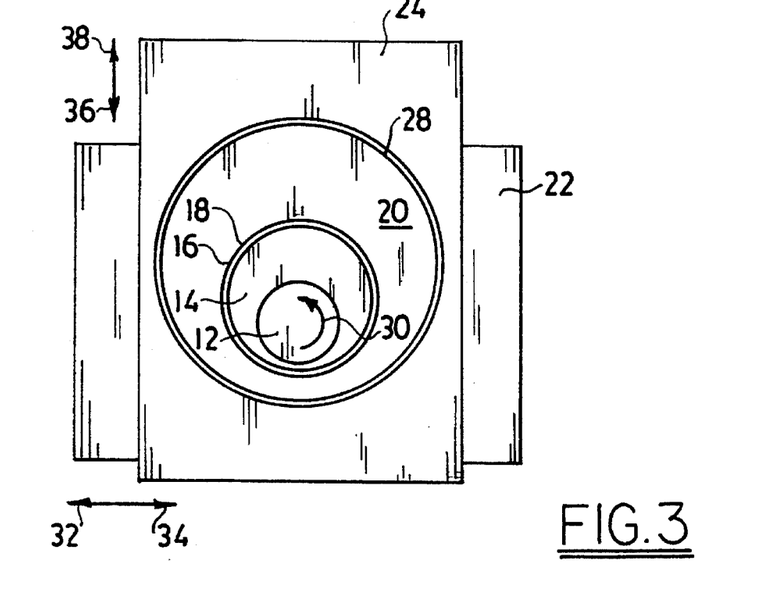
FIG. 3 is a rear view of the translator of FIG. 1.

FIG. 2 is a front view of the translator 10 of FIG. 1; and FIG. 3 is a back view of such translator.

Figure 4:
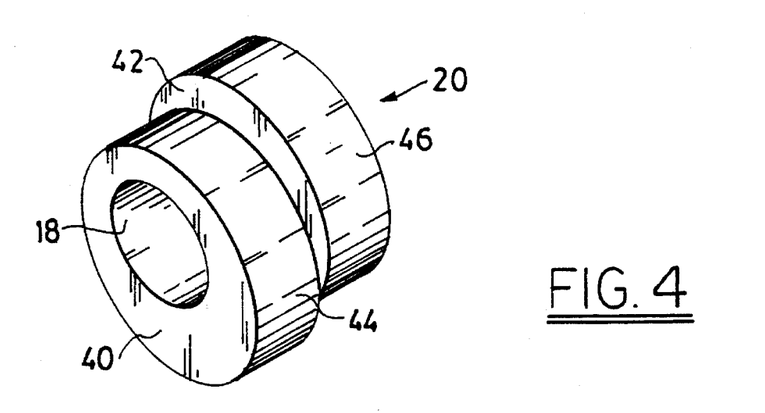
FIG. 4 is a perspective view of the multiple eccentric used in the translator of FIG. 1.

FIG. 4 is a perspective view of multiple eccentric 20. Referring to FIG. 4, it will be seen that multiple eccentric 20 is comprised of eccentric 40 and 42 which, in the preferred embodiment illustrated in the FIG. 4, are integrally connected to each other. In one preferred embodiment, not shown, multiple eccentric 20 is comprised of three eccentrics. In another embodiment, not shown, multiple eccentric 20 is comprised of four eccentrics. Although multiple eccentric 20 may be comprised of as many eccentrics as desired, it is preferred that no more than ten such eccentrics be used and, more preferably, no more than four such eccentrics be used.

Referring again to FIG. 4, and in the preferred embodiment illustrated therein, it will be seen that eccentrics 40 and 42 are uniformly displaced around bore 18. Thus, in the preferred embodiment illustrated in FIG. 4, eccentrics 40 and 42 are 180 degrees out of phase with each other. When three such eccentrics are used, they are 120 degrees out of phase with each other. When four such eccentrics are used, they are 90 degrees out of phase with each other.

Referring again to FIG. 4, and in the preferred embodiment illustrated therein, eccentrics 40 and 42 are integrally connected to each other. In another embodiment, not shown, eccentrics 40 and 42 are rigidly joined to each other by conventional means such as, e.g., pins.

It will be seen that bore 18 is circular in cross section.

Referring again to FIG. 4, it will be seen that each of eccentrics 40 and 42 is comprised of a circumferential bearing surface (such as bearing surfaces 44 and 46, respectively) which are contiguous with bearing 16 (see FIG. 1).

Figure 5:
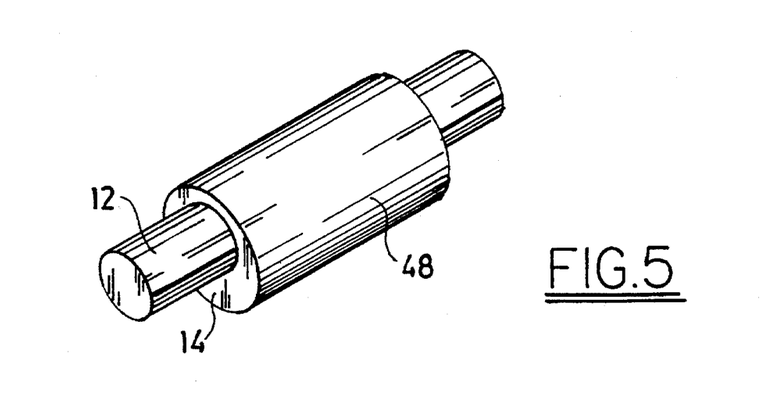
FIG. 5 is a perspective view of the shaft and eccentric assembly used in the translator of FIG. 1.

FIG. 5 is a perspective view of the shaft 12/eccentric 14 assembly. Referring to FIG. 5, it will be seen that shaft 12 is cylindrical in shape and that it is preferably integrally connected to eccentric 14. In one embodiment, not shown, eccentric 14 is rigidly connected to shaft 12 by conventional means.

The shaft 12/eccentric 14 assembly is disposed within circular bore 18 of multiple eccentric 20 (see FIGS. 4 and 1) and, preferably, is separated from such structure by bearing sleeve 16 (see FIG. 1). The circumferential bearing surface 48 of eccentric 14 is contiguous with bearing 16 (see FIG. 1).

As is known to those skilled in the art, the eccentricity of eccentrics 14, 40, 42 is the distance of the geometric center of a revolving body from the axis of rotation; and it may be determined by means well known to those skilled in the art. See, e.g., U.S. Pat. Nos. 5,105,684, 5,095,858, 5,092,826, 5,088,842, 5,083,488, and the like. The entire disclosure of each of these United States patents is hereby incorporated by reference into this specification.

In applicants' translator 10, the eccentricity of eccentric 14 of shaft 12, the eccentricity of eccentric 40 of multiple eccentric 20, and the eccentricity of eccentric 42 of multiple eccentric 20, are all equal to each other. As will be apparent to those skilled in the art, when multiple eccentric 20 has more than two eccentrics, each of such eccentrics will each also have the same eccentricity.

Figure 6:
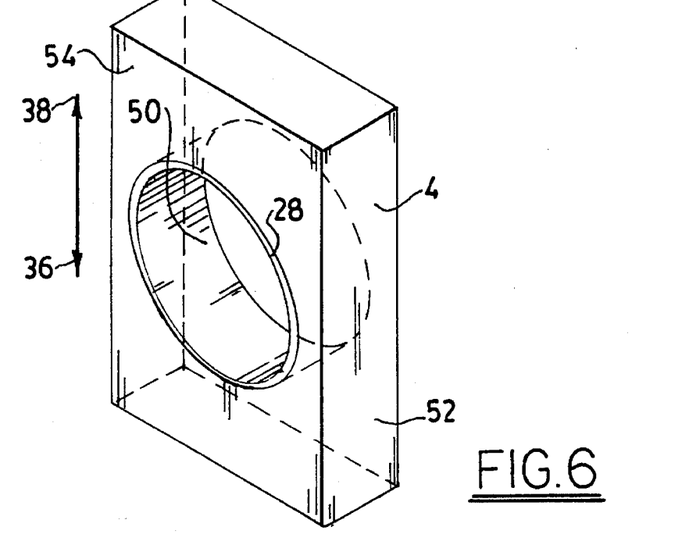
FIG. 6 is a perspective view of a linear slide used in the translator of FIG. 1.

FIG. 6 is a perspective view of slide 24 in which the shaft 12/eccentric 14/multiple eccentric assembly 20 is disposed; the circumferential bearing surface 46 of eccentric 42 is contiguous with bearing 28 (see FIG. 1) which, in turn, is disposed within bore 50. As will be apparent to those skilled in the art (see FIG. 1), slide 22 has a similar configuration.

Referring again to FIG. 6, it will be seen that bore 50 is circular in shape. It will also be seen that slide 24 is comprised of linear bearing surface 52 and opposing linear bearing surface 54 which allows slide 24 to move linearly in the directions of arrows 38 and 36 when shaft 12 (not shown) rotates and when slide 24 is disposed within a guide (not shown).

Figure 7:
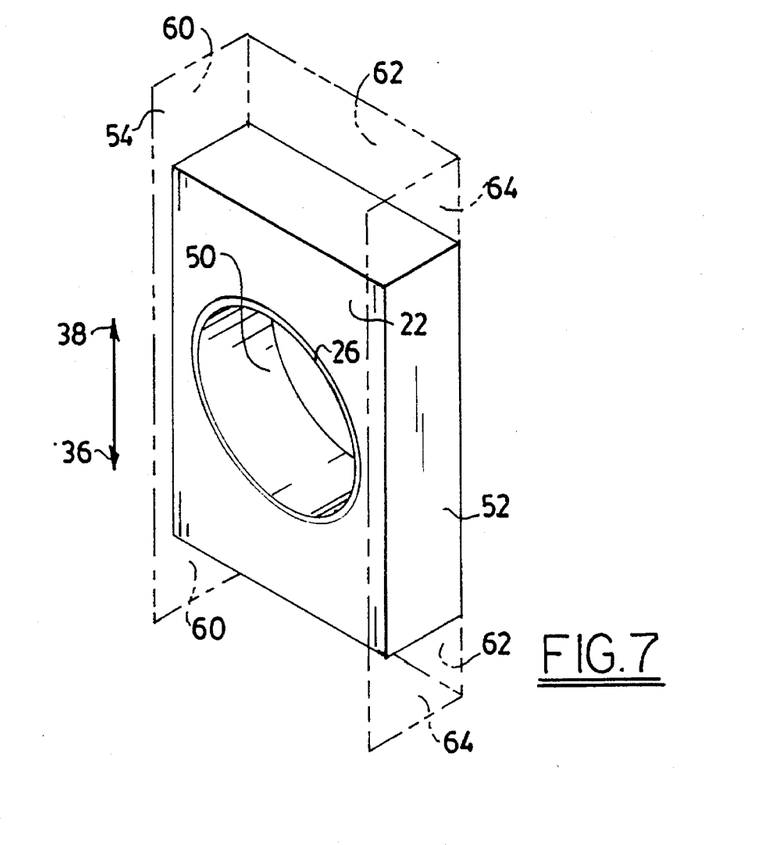
FIG. 7 is a perspective view of the slide of FIG. 6, illustrating it disposed in a phantom channel.

FIG. 7 is a depiction similar to that of FIG. 6 but illustrating, in phantom lines 60, 62, and 64, the extent of the linear motion of slide 24 when shaft 12 (not shown) rotates.

Figure 8:
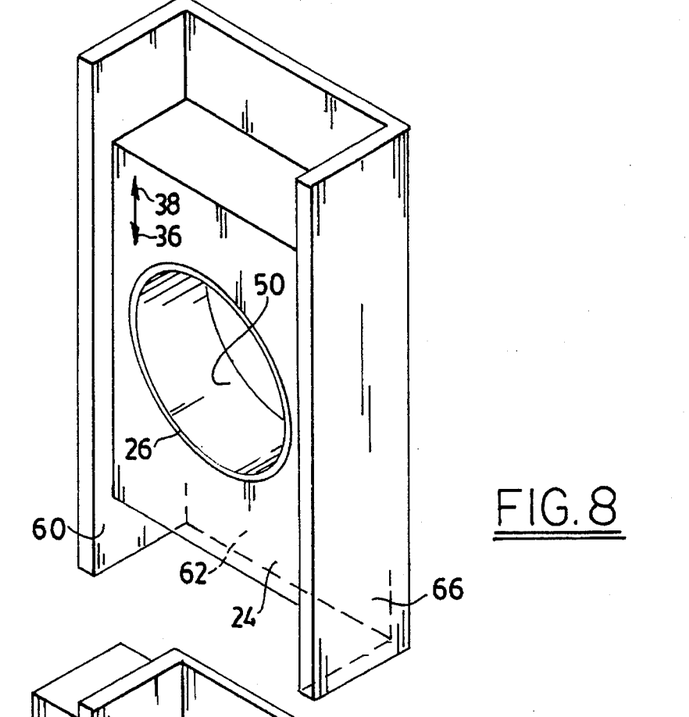
FIG. 8 is a perspective view of the slide of FIG. 6, showing it disposed in a slide housing.

In the preferred embodiment of device 10 of this invention, and referring to FIG. 8, it will be seen that each of slides 22 and 24 is disposed within a slide housing. Thus, referring to FIGS. 8 and 9, slide 24 is disposed within slide housing 66, and slide 22 is disposed within slide housing 68; and slide housing 68 is disposed 90 degrees respect to slide housing 66.

Referring again to FIG. 8, slide 24 may be connected by conventional means to a means for utilizing the linear motion (not shown) such as,e.g., a push/pull rod, a diaphragm, a volume of fluid which undergoes compression or expansion, etc.

Figure 9:
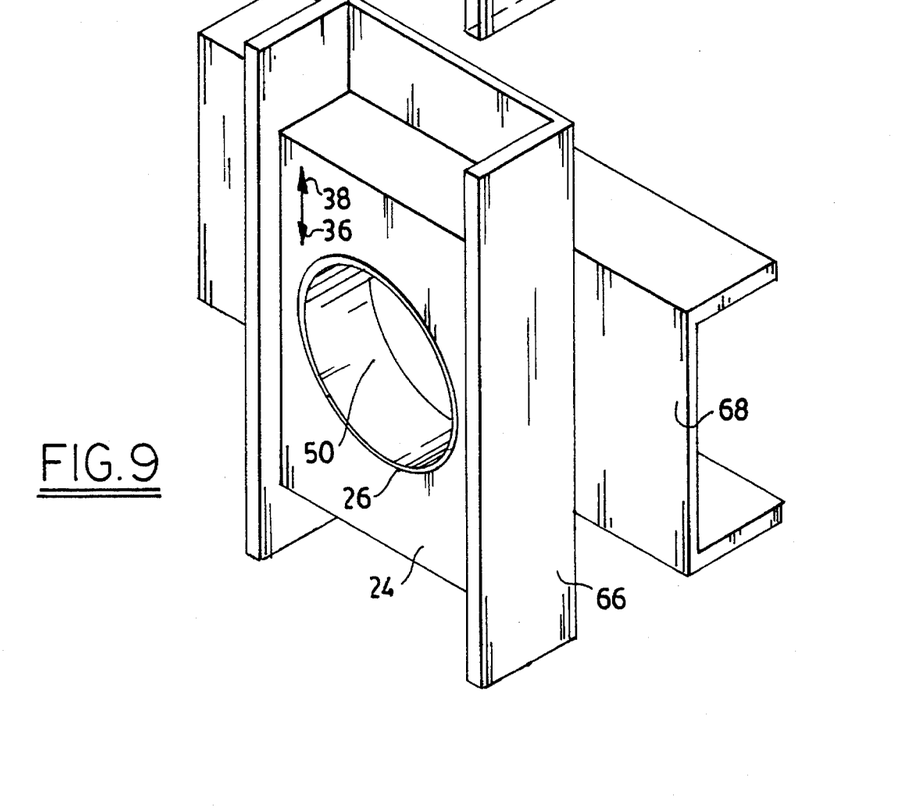
FIG. 9 is a perspective view of two slide assemblies orthogonally disposed vis-a-vis each other.
Figure 10A:
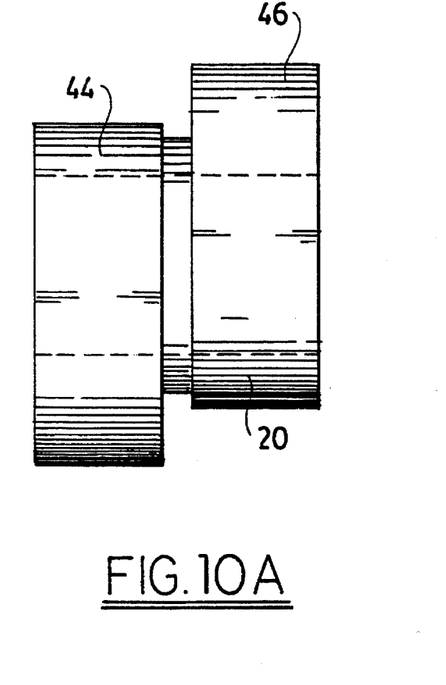
FIG. 10A is a side view of the multiple eccentric of the translator of FIG. 1.
Figure 10B:
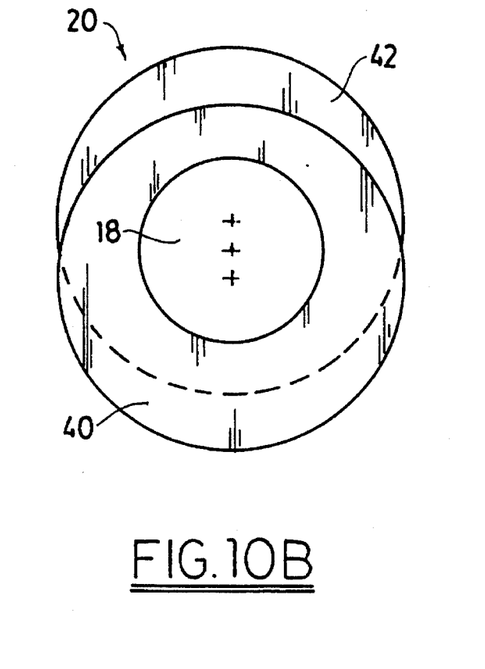
FIG. 10B is a front view of the multiple eccentric of FIG. 10A.
Figures 11A, 11B:
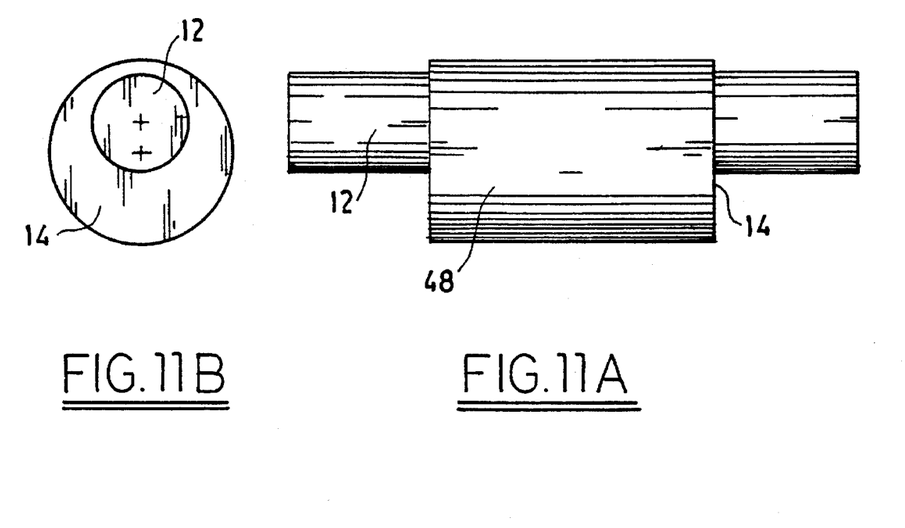
FIG. 11A is a side view of the shaft of the translator of FIG. 1.
FIG. 11B is a front view of the shaft of FIG. 11A.

FIG. 9 illustrates a preferred embodiment utilizing the dual eccentric device of FIG. 1 (not shown in FIG. 9) as viewed from the rear of such device. Referring to FIG. 9, it will be seen that the shaft 12/eccentric 14/multiple eccentric 20 assembly which is disposed within and rotates within bore 50 will cause the simultaneous movement of slides 24 and 22 in different directions.

Figure 12:
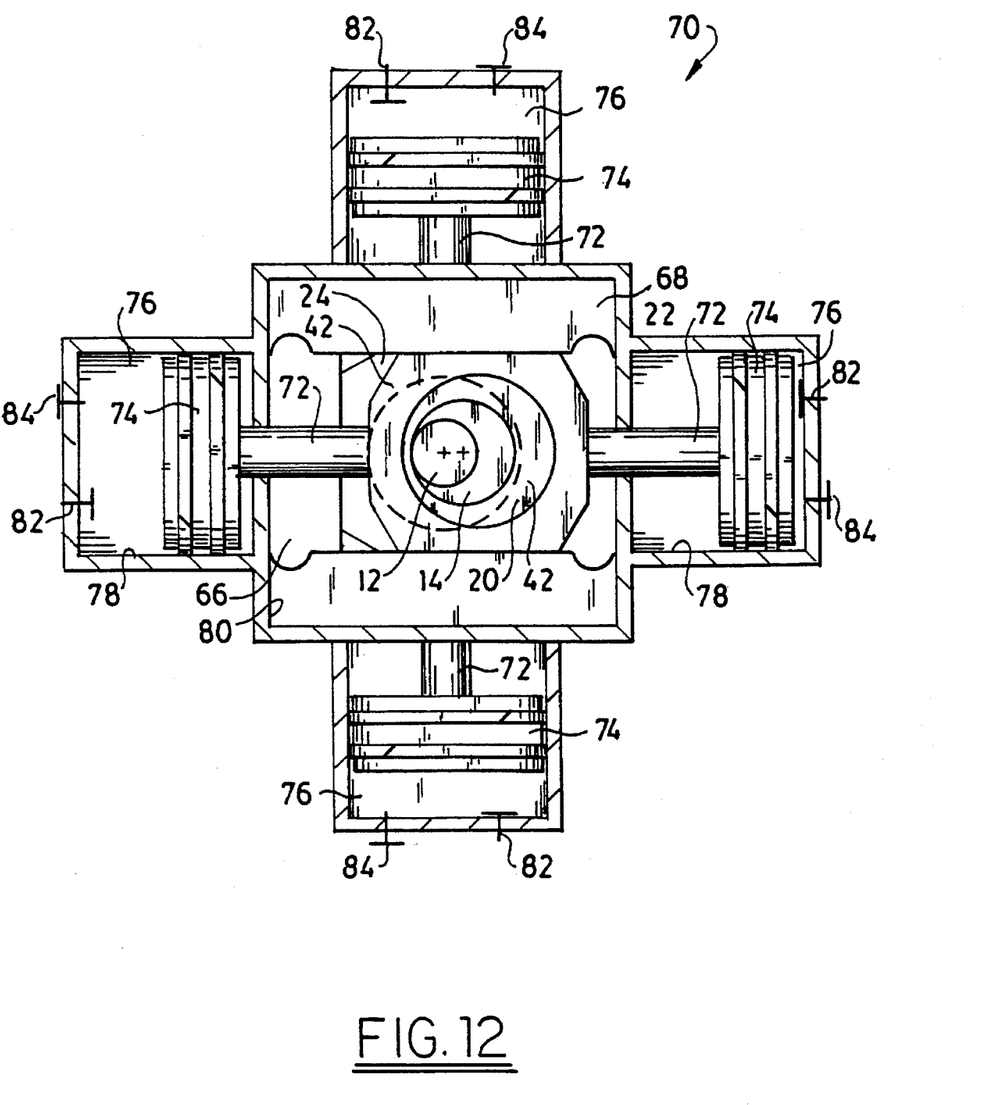
FIG. 12 is cross-sectional view of one preferred embodiment of a compressor of this invention.

FIG. 12 is a sectional view of one preferred embodiment of a gaseous compressor 70. Referring to FIG. 12, it will be seen that slide 22 is connected to piston rod 72 and causes by its linear motion piston 74 to compress gas within compression chamber 76; as will be seen from FIG. 12, cylinder head 78 is preferably integrally attached to housing 80 of translator 10. Inlet valve 82 and discharge valve 84 allow the inflow and outflow of gas.

As will be apparent to those skilled in the art, the operation of piston rod 72 and piston 74 has only been described with reference to the right-hand chamber associated with slide 22 constrained by slide housing 68. It will be apparent that the same operation occurs in the left handchamber associated with slide 22, and in the top and bottom chambers associated with slide 24.

Figure 13:
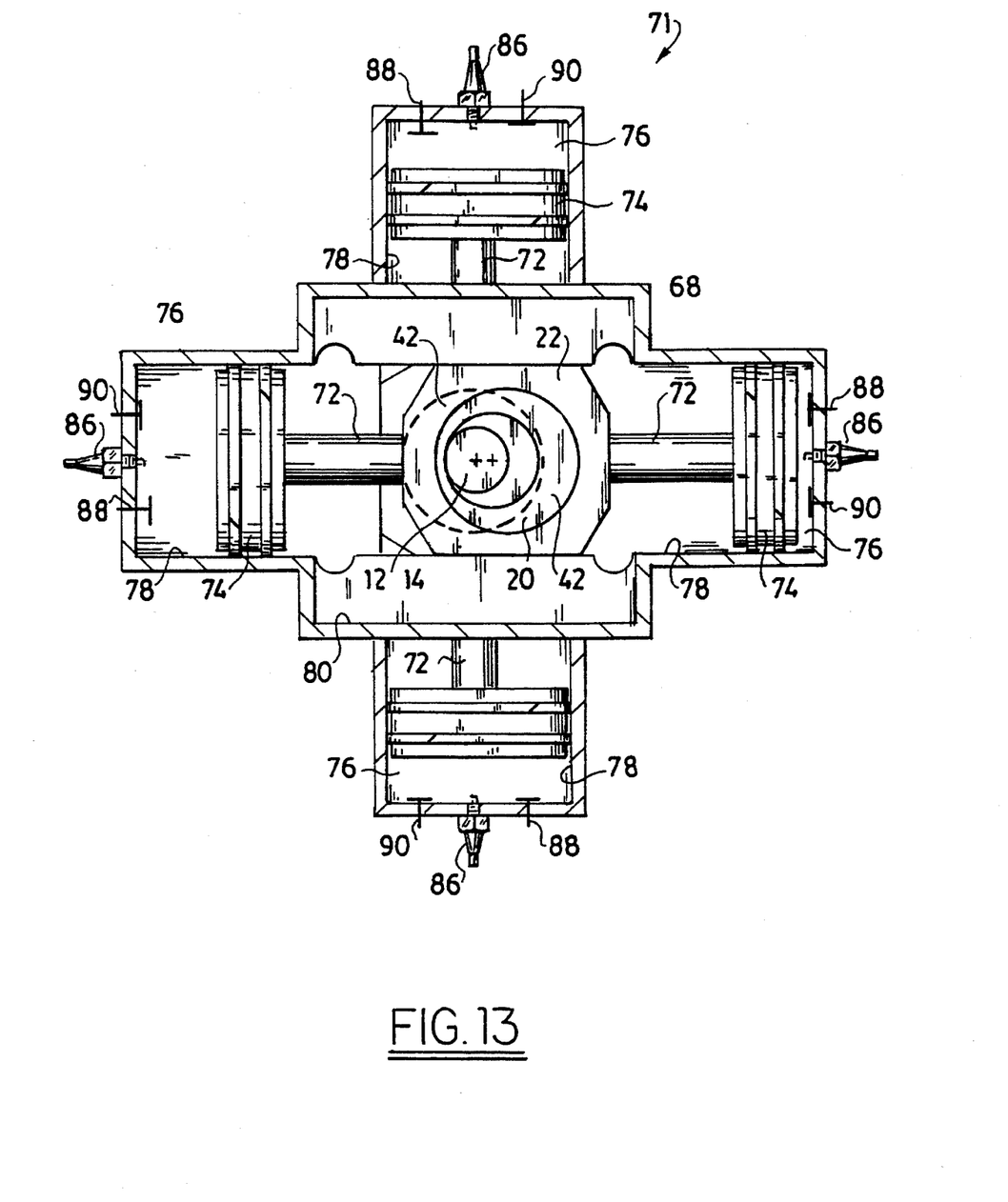
FIG. 13 is a cross-sectional view of one preferred embodiment of an engine of this invention.

FIG. 13 is a sectional view of an internal combustion/ expansion device which is substantially identical to the device 70 of FIG. 13 with the exception that it contains ignition means (such as spark plugs 86). In another embodiment, not shown, an external combustion/expansion device similar to the device of FIG. 13 but without ignition means 86 is provided.

Referring to FIG. 13, and in the embodiment illustrated therein, inlet valve 88 and discharge valve are actuated by a drive train (not shown).

FIGS. 14 though 19 illustrate the linear motion which results as shaft 12 rotates. Referring to these Figures, P is the center of the eccentric 14 of shaft 12. O is the center of shaft 12. R is the eccentricity of eccentric 14. B is the center of the eccentric 42. A is the center of eccentric 40. Y is the line along which the center of bore 50 of slide 24 moves. X is a similar line for the center of the bore (not shown) of slide 22.

Figure 14A:
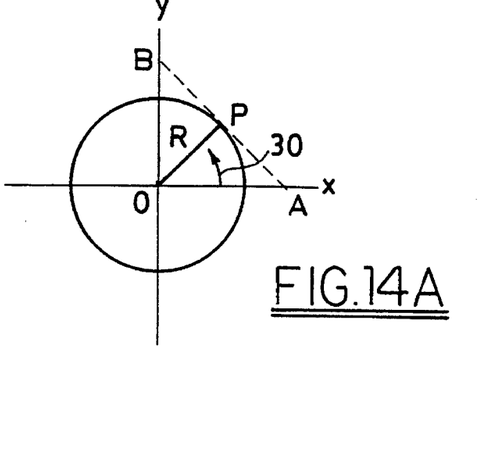
FIGS. 14A–14F are a series of diagrams illustrating the linear motion which results from the first ninety degrees of counterclockwise rotation of the shaft of the device of FIG. 1.
Figure 14B:
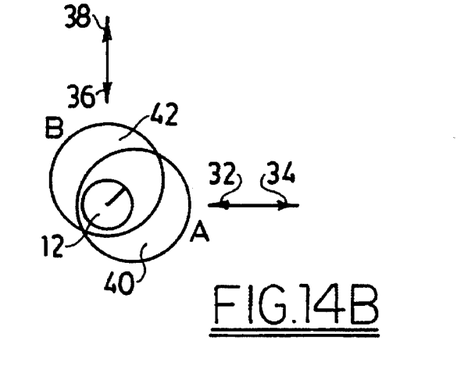

Referring to FIGS. 14A and 14B, as the shaft rotates in the direction of arrow 30 from its 0 degree position to its 45 degree position, point A travels linearly from right to left in the direction of arrow 32. Similarly, during the stage, point B travels linearly from its origin to the top in the direction of arrow 38, such origin being equidistant from the top and bottom of such travel. FIG. 14B shows the position of points A and B after such 45 degrees of rotation.

Figure 14C:
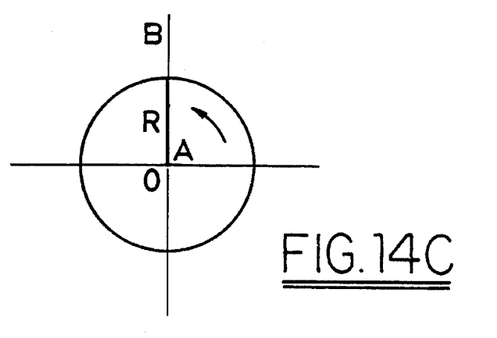
Figure 14D:
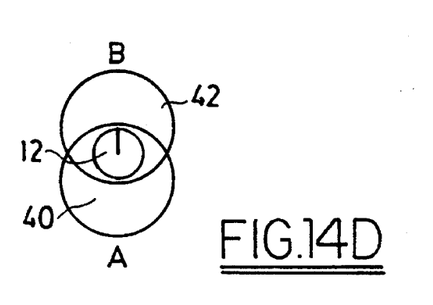
Figure 14E:
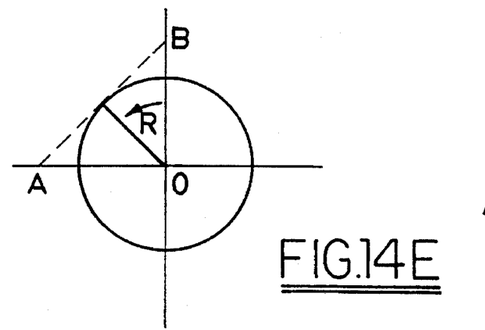
Figure 14F:
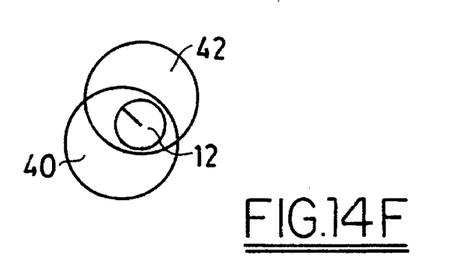
Figure 15A:
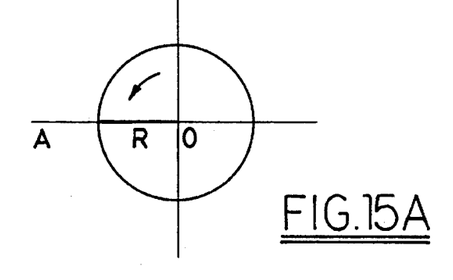
FIGS. 15A–15F are a series of diagrams illustrating the linear motion which results from the second ninety degrees of counterclockwise rotation of the shaft of the device of FIG. 1.
Figure 15B:
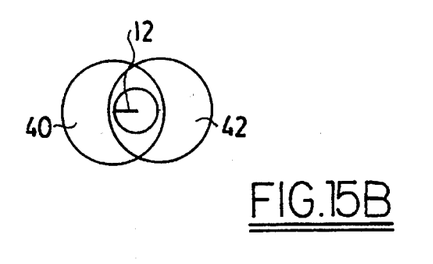
Figure 15C:
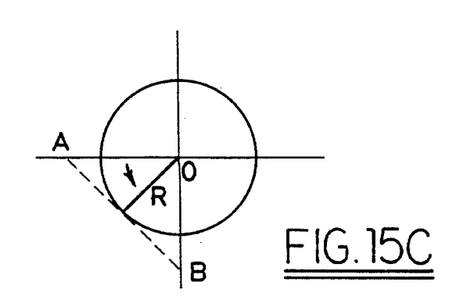
Figure 15D:
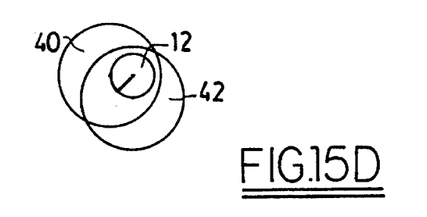
Figure 15E:
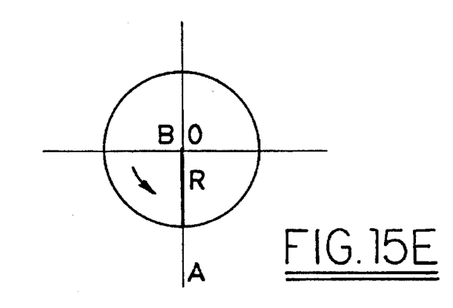
Figure 15F:
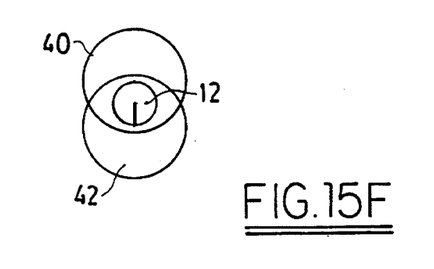
Figure 16A:
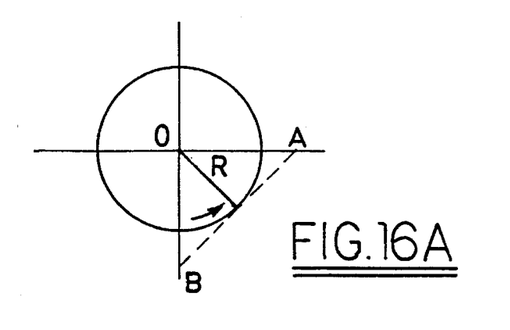
FIGS. 16A–16D are a series of diagrams illustrating the linear motion which results from the next forty-five degrees of counterclockwise rotation of the shaft of the device of FIG. 1.
Figure 16B:
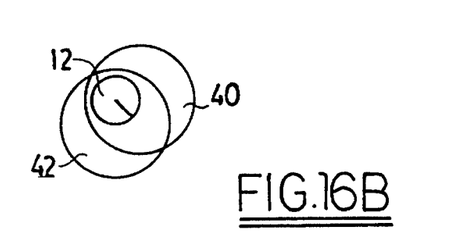
Figure 16C:
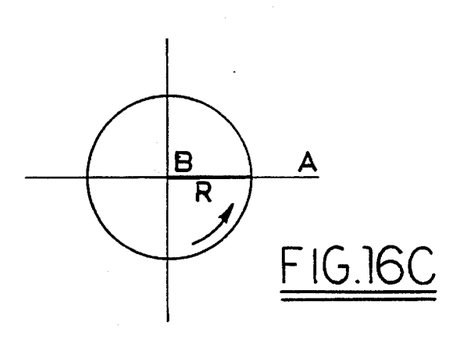
Figure 16D:
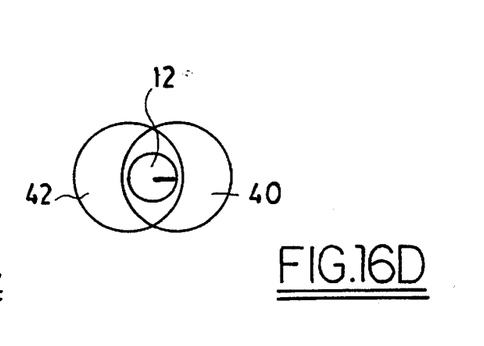
Figure 17A:
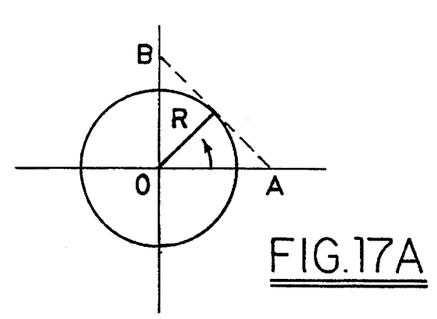
FIGS. 17–19 is a series of diagrams comparable to FIGS. 14–16, respectively but additionally illustrating the attachment of the slide mechanism used in the device of FIG. 1.
Figure 17B:
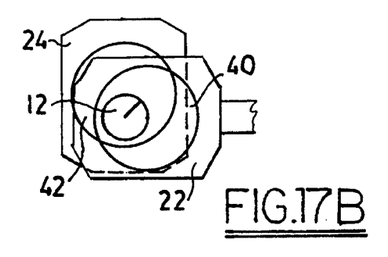
Figure 17C:
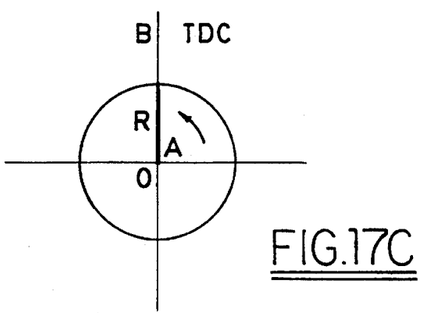
Figure 17D:
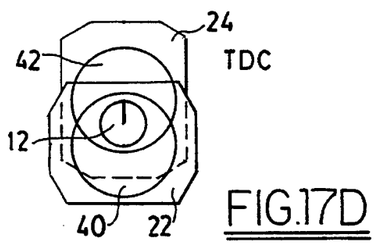
Figure 17E:
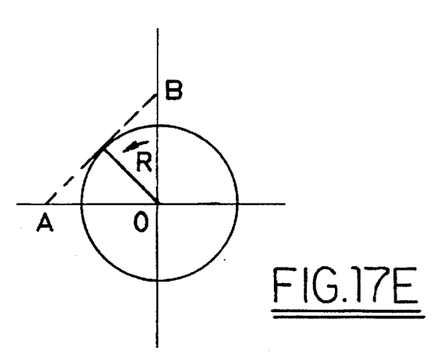
Figure 17F:
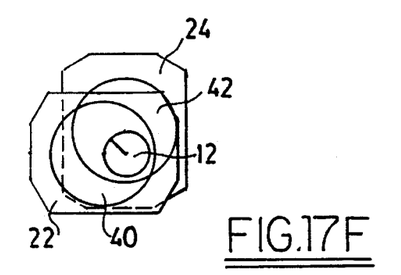
Figure 18A:
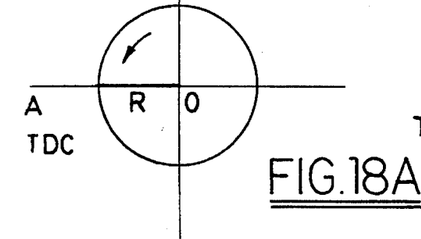
Figure 18B:
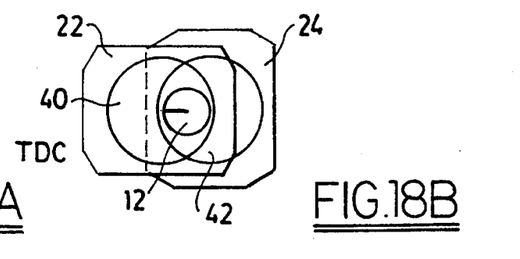
Figure 18C:
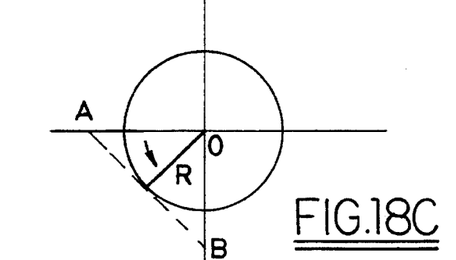
Figure 18D:
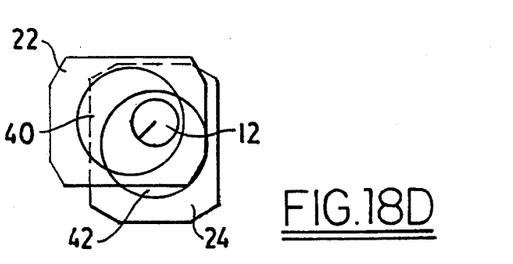
Figure 18E:
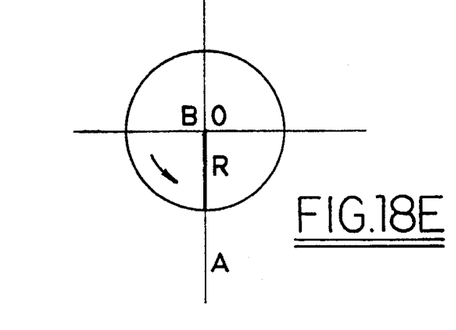
Figure 18F:
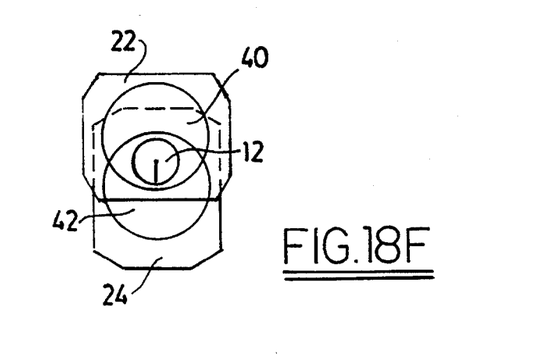
Figure 19A:
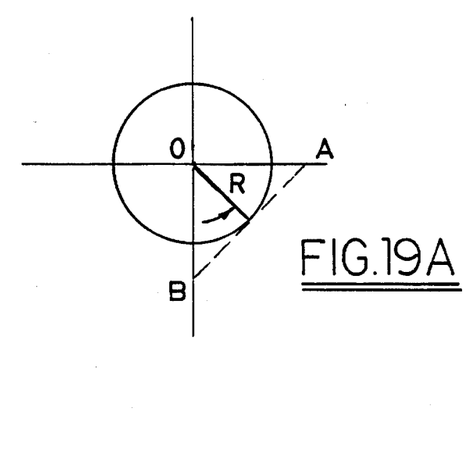
Figure 19B:
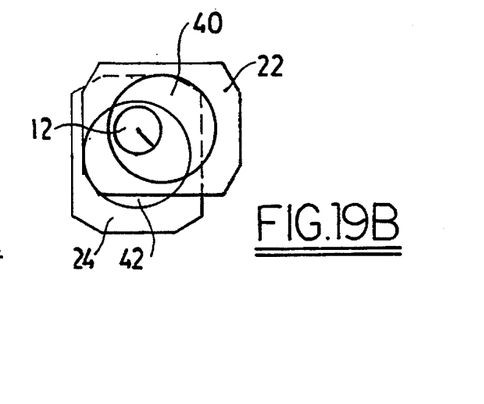
Figure 19C:
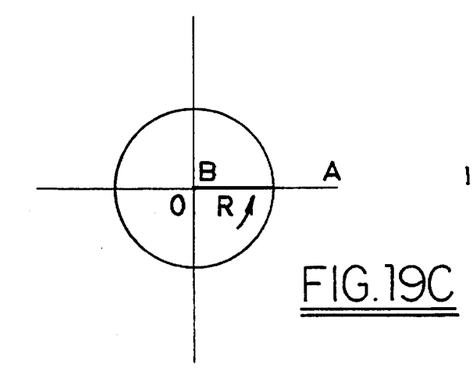
Figure 19D:
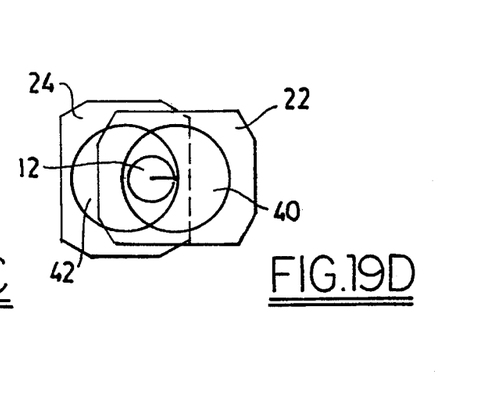

FIGS. 14C and 14D similarly show the position of points A and B after shaft 12 has rotated 90 degrees. FIGS. 14E and 14F similarly show the position of points A and B after shaft 12 has rotated 135 degrees. FIGS. 15A and 15B similarly show the position of points A and B after shaft 12 has rotated 180 degrees. FIGS. 15C and 15D similarly show the position of points A and B after shaft 12 has rotated 225 degrees. FIGS. 15E and 15F similarly show the position of points A and B after shaft 12 has rotated 270 degrees. FIGS. 16A and 16B similarly show the position of points A and B after shaft 12 has rotated 315 degrees. FIGS. 16C and 16D similarly show the position of points A and B after shaft 12 has rotated 360 degrees.

FIGS. 17 through 19 are substantially identical to the diagrams of FIGS. 14 through 16 with the exception that, in the latter Figures, slides 22 and 24 are illustrated.

We claim:

1. An apparatus for directly converting rotary motion to alternating linear motion comprising:

(a) a cylindrical shaft and a first eccentric mounted on said shaft, (b) a multiple eccentric comprised of a second eccentric integrally connected to a third eccentric, and a first cylindrical bore extending through said second eccentric and said third eccentric, wherein:

1. each of said first eccentric, said second eccentric, and said third eccentric has an eccentricity which is equal to the eccentricity of each of the other of said first eccentric, said second eccentric, and said third eccentric, 2. said shaft and said first eccentric are disposed within said first bore such that the rotation of said shaft and said first eccentric causes the rotation of said second eccentric and said third eccentric;

(c) a first slide comprised of a second bore, wherein said cylindrical shaft, said first eccentric, and said second eccentric are disposed within said second bore such that the rotation of said shaft and said second eccentric causes a first reciprocating linear movement of said first slide;

(d) a second slide comprised of a third bore, wherein said cylindrical shaft, said first eccentric, and said third eccentric are disposed within said bore such that the rotation of said shaft and said third eccentric causes a second reciprocating linear movement of said second slide, and wherein said second reciprocating linear movement is different in direction than said first reciprocating linear movement;

(e) a first means for guiding said first slide in a first plane which is substantially perpendicular to the axis of said cylindrical shaft; and (f) a second means for guiding said second slide in a second plane which is substantially perpendicular to the axis of said cylindrical shaft, wherein said first plane and said second plane are substantially parallel to each other, and wherein said first slide and said second slide are not coplanar with each other.

2. The apparatus as recited in claim 1, wherein said second eccentric and said third eccentric are equidistantly disposed around said shaft 180 degrees from each other, and wherein said second linear movement is perpendicular to that of said first linear movement.

3. The apparatus as recited in claim 1, wherein said apparatus is comprised of a first guide for said first slide.

4. The apparatus as recited in claim 3, wherein said apparatus is comprised of a second guide for said second slide.

5. The apparatus as recited in claim 1, wherein said first slide is connected to a piston rod.

6. The apparatus as recited in claim 5, wherein said second slide is connected to a piston rod.

7. The apparatus as recited in claim 1, wherein said shaft is contiguous with a first rolling element bearing disposed within said first bore.

8. The apparatus as recited in claim 7, wherein said first rolling element bearing is a sleeve bearing.

9. The apparatus as recited in claim 1, wherein said shaft is comprised of a proximal end and a distal end.

* * * * *